United States Patent
Reichert

(10) Patent No.: US 10,549,837 B2
(45) Date of Patent: Feb. 4, 2020

(54) WINDOW FRAME SYSTEM, WINDOW FRAME ATTACHMENT SYSTEM AND VEHICLE HULL WINDOW FRAME ATTACHMENT SYSTEM

(71) Applicant: Airbus Operations GmbH, Hamburg (DE)

(72) Inventor: Dennis Reichert, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 316 days.

(21) Appl. No.: 15/636,091

(22) Filed: Jun. 28, 2017

(65) Prior Publication Data
US 2018/0001989 A1    Jan. 4, 2018

(30) Foreign Application Priority Data
Jun. 30, 2016    (EP) .................................... 16177213

(51) Int. Cl.
*B64C 1/14* (2006.01)
*B64C 1/06* (2006.01)

(52) U.S. Cl.
CPC ............ *B64C 1/1492* (2013.01); *B64C 1/064* (2013.01)

(58) Field of Classification Search
CPC ............................. B64C 1/064; B64C 1/1492
See application file for complete search history.

(56) References Cited

U.S. PATENT DOCUMENTS

| | | | | |
|---|---|---|---|---|
| 2,121,094 A | * | 6/1938 | Nuding | E06B 1/38 52/204.65 |
| 2,575,854 A | * | 11/1951 | Verhagen | B60J 1/001 52/127.8 |
| 4,004,388 A | * | 1/1977 | Stefanik | B32B 17/10293 52/204.593 |
| 6,818,281 B2 | * | 11/2004 | Blevins | B32B 17/10036 296/187.03 |
| 6,892,984 B2 | * | 5/2005 | Wood | B64C 1/1476 244/121 |
| 7,118,070 B2 | * | 10/2006 | Abrams | B60J 1/006 244/129.3 |
| 7,552,896 B2 | * | 6/2009 | Coak | B64C 1/1492 244/129.3 |

(Continued)

FOREIGN PATENT DOCUMENTS

| | | |
|---|---|---|
| EP | 2682340 | 1/2014 |
| WO | 2009109456 | 9/2009 |

OTHER PUBLICATIONS

European Search Report, dated Dec. 15, 2016, priority document.

*Primary Examiner* — Justin M Benedik
(74) *Attorney, Agent, or Firm* — Greer, Burns & Crain, Ltd.

(57) ABSTRACT

A window frame system, comprising a window frame having an aperture there-through and circumferentially arranged window frame through-holes in a first window frame portion and a second window frame portion, and a stringer coupling with stringer coupling through-holes in a first stringer coupling portion and a second stringer coupling portion. In an overlapping arrangement, the first window frame portion and the first stringer coupling portion are adapted to overlap with their through-holes coaxially, wherein the respective through-holes of the two first portions have different diameters.

20 Claims, 4 Drawing Sheets

(56) References Cited

U.S. PATENT DOCUMENTS

| | | | | |
|---|---|---|---|---|
| 9,174,721 B2* | 11/2015 | Dazet | .................... | B64C 1/1492 |
| 2006/0060705 A1* | 3/2006 | Stulc | ....................... | B64C 1/069 |
| | | | | 244/119 |
| 2010/0320324 A1 | 12/2010 | Dittmar et al. | | |
| 2014/0001311 A1* | 1/2014 | Dopker | ................... | B64C 1/069 |
| | | | | 244/120 |
| 2015/0082708 A1* | 3/2015 | Eilken | ................... | B64C 1/1407 |
| | | | | 49/477.1 |

* cited by examiner

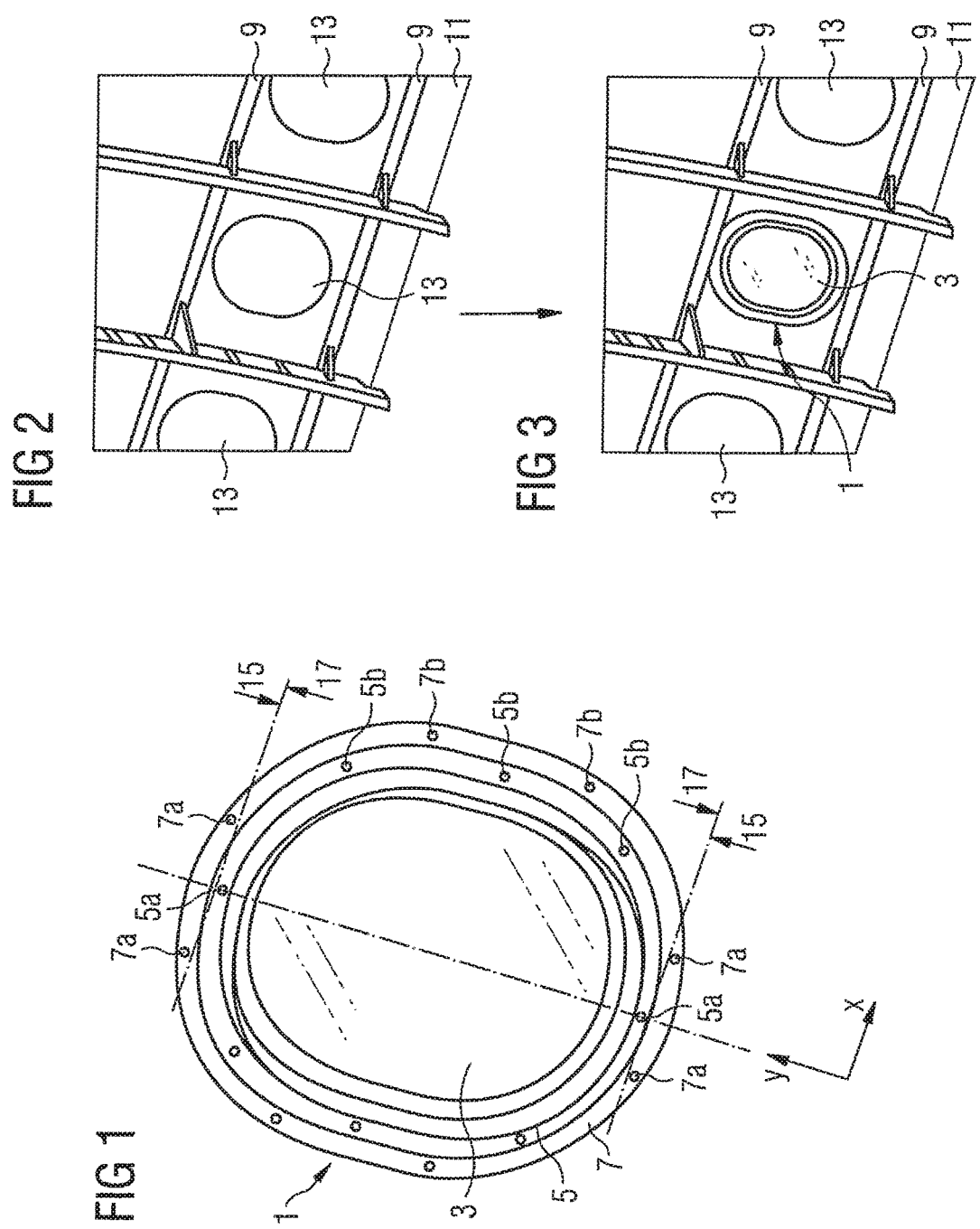

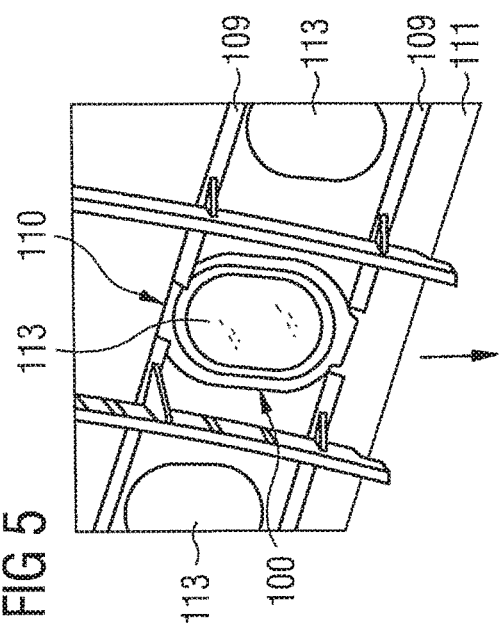
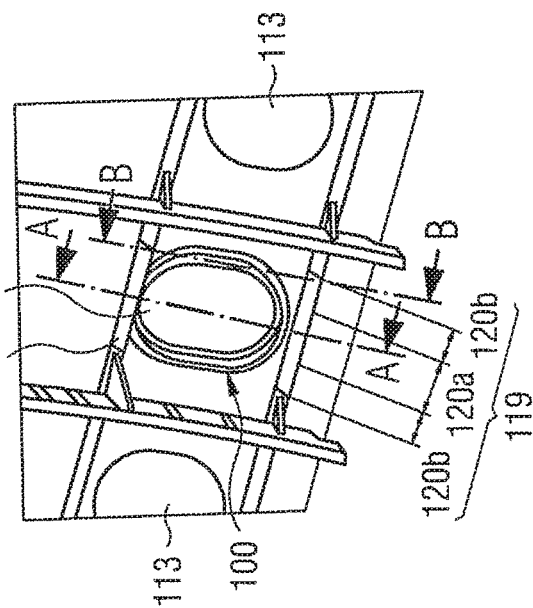
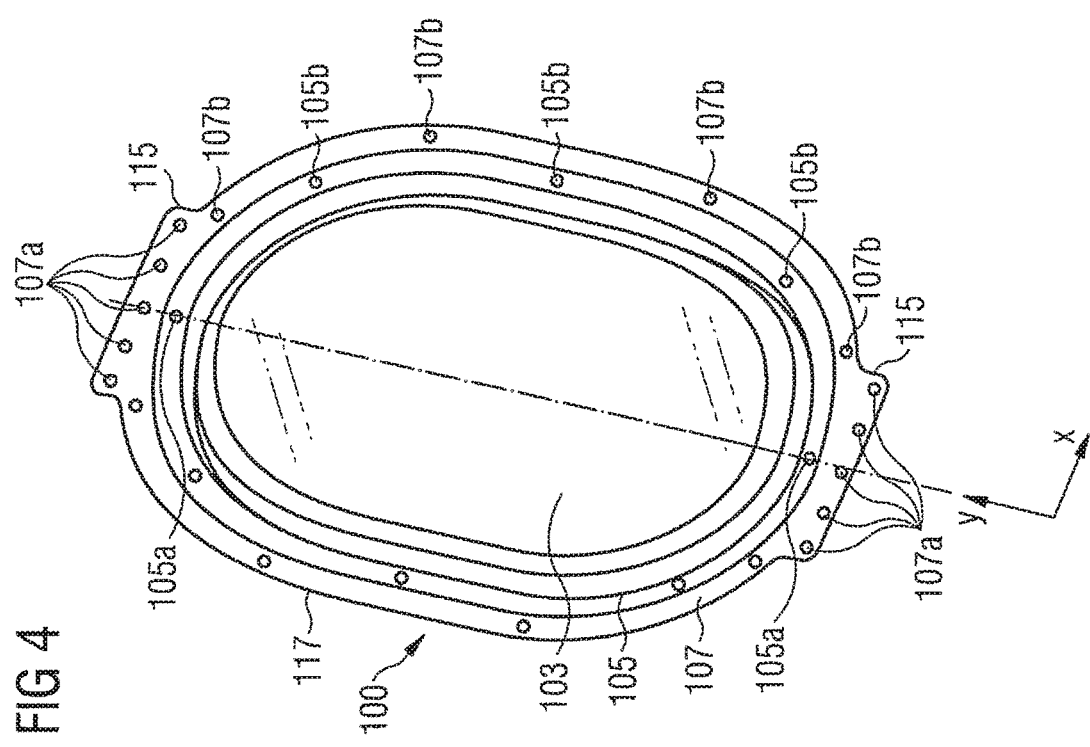

FIG 7
A-A
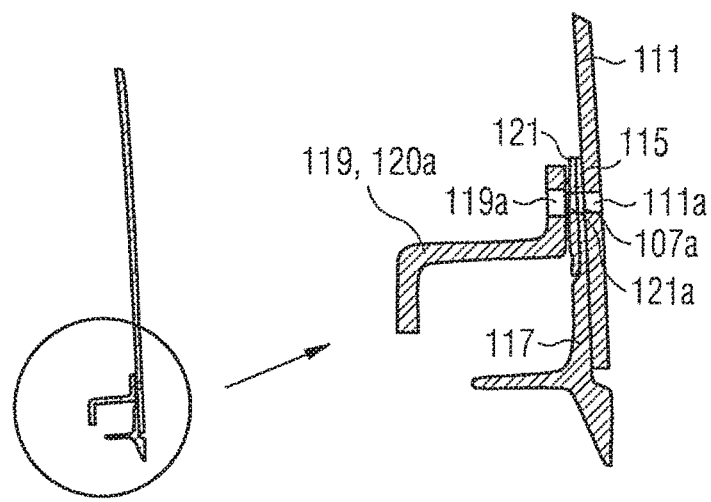
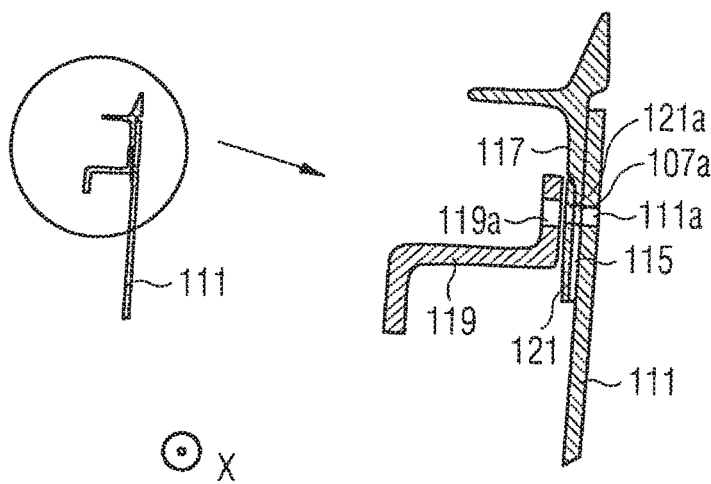

B-B

WINDOW FRAME SYSTEM, WINDOW FRAME ATTACHMENT SYSTEM AND VEHICLE HULL WINDOW FRAME ATTACHMENT SYSTEM

CROSS-REFERENCES TO RELATED APPLICATIONS

This application claims the benefit of the European patent application No. 16 177 213.2 filed on Jun. 30, 2016, the entire disclosures of which are incorporated herein by way of reference.

BACKGROUND OF THE INVENTION

The invention relates to a window frame system, window frame attachment system and vehicle hull window frame attachment system, as well as to a use of such systems.

Conventional window frames in a vehicle, such as an airplane, are riveted to the hull and/or to stringers along the hull.

US 2006/0060705 A1 teaches the provision of an airplane window frame, being attached to a strap. This strap is attached to a skin with a plurality of fasteners. A plurality of fittings are positioned on the strap. A plurality of fasteners extending through the fittings attaches the fittings to the underlying structures to form a structural load path.

SUMMARY OF THE INVENTION

A problem to be solved by the present invention is to provide a window frame system which allows to make optimum use of the available space without changing the primary structure arrangement of the vehicle.

A window frame system comprises a window frame with an aperture there-through and circumferentially arranged window frame through-holes in a first window frame portion and a second window frame portion, and a stringer coupling with stringer coupling through-holes in a first stringer coupling portion and a second stringer coupling portion, wherein, in an overlapping arrangement, the first portions are adapted to overlap with their through-holes coaxially, wherein the respective through-holes of the first portions have different diameters. Thereby a decoupling arrangement between the window frame and the stringer coupling is achieved, such that a shearing force in a plane of the window frame or the first window frame portion is not transmitted from the window frame to the stringer coupling in an attached overlapping arrangement. Also, the overlapping arrangement saves space, because the first portion through-holes can not only be used for attaching the window frame and the stringer coupling in their overlapping arrangement but for attaching both to other elements.

The first stringer coupling through-holes may have a larger diameter than the first window frame through-holes. Thereby existing windows frame concepts can be used, while suitable stringer couplings are manufactured, which is generally cheaper. Also, existing window frame concepts can be easily upgraded to the above decoupling arrangement.

The first window frame portion may be, preferably symmetrically, arranged on opposite outer sides of the second window frame portion. Thereby handling of the window frame and achieving the overlapping arrangement is simplified. Also, for a symmetrical arrangement, forces are uniformly absorbed by the window frame.

The aperture may be a circular or an elongated hole, and/or the window frame through-holes may be arranged equidistantly from the aperture in at least one portion surrounding the aperture, wherein, in the overlapping arrangement, the first stringer coupling through-holes overlap with the first window frame through holes comprising window frame through holes in the outermost portion or portions from the aperture. Thereby the portion(s) already provided in the window frame for attaching the window frame to other elements can be used, which increases the possible window frame dimensions and, thus, increases the possible window frame aperture.

The second window frame portion may surround the aperture uniformly, while the first window frame portion extends tangentially to the second window frame portion, preferably the first window frame portion being rectangular with, preferably rounded, edges. Thereby a rearrangement and/or increase of the first window frame through-holes can be provided in order to achieve correspondence with the first stringer coupling through-holes, which may have a certain pitch requirement.

The window frame through-holes may be arranged in at least one, preferably two, portions surrounding the aperture, wherein at least two portions are at different heights in a stepped down cross-section at, and preferably towards, the outer edge of the window frame. Thereby positioning of the stringer coupling and the window frame in their overlapping arrangement is simplified, because the stringer coupling can be abutted against a step in the window frame.

The stringer coupling may be adapted to extend, preferably in its longitudinal direction, beyond the window frame, in the overlapping arrangement. Thereby the stringer coupling can be attached to other elements.

The first stringer coupling through-holes may have a larger diameter than the second stringer coupling through-holes. Thereby the stringer coupling may be tightly coupled to other elements, while decoupled from the window frame.

The length of the stringer coupling may correspond at least to the width of the window frame, preferably the length of the stringer coupling being longer than the width of the window frame, preferably the stringer coupling being Z-, V-, W- or Π-shaped.

Thereby the above coupling to other elements can further be simplified, because of the increased length of the stringer coupling. While the stringer coupling presented here is Z-shaped, other shapes may be used as well. For example, a V-shape may resemble the Π-shape with a flat base and inclined sides. Moreover, the sides or inclined sides of each of these shapes may have appendices extending at their free ends at an angle away from the respective shape, preferably along a common line. Of course, the same applies to the W-shape, which is already similar to the V-shape.

The stringer coupling may have a recess or an indentation adapted to receive the first window frame portion, preferably the recess or the indentation having a depth equal to or greater than the thickness of the first window frame portion, preferably the first window frame portion having the same material thickness as the second stringer coupling portion. Thereby positioning of the stringer coupling and the window frame in their overlapping arrangement is simplified, because the first portion of the window frame can be placed inside the recess or indentation.

A window frame attachment system may have at least one of the above window frame systems and at least one stringer, wherein the first window frame portion is configured to fit in a space cutout from a stringer, in the overlapping arrangement, preferably the space being longer than a length of the first window frame portion in a main extension direction of the first window frame portion, preferably the space being as long as the sum of the length of the first window frame portion in its main extension direction and the diameter difference between the first through-holes of the first portions. Thereby the decoupling arrangement is further improved, because a shearing force is not capable of causing abutment between the window frame and the stringer in a shearing force direction.

The stringer coupling may resemble the shape of the stringer, preferably corresponding to the shape of the stringer. Thereby the manufacturing and maintenance of the stringer coupling and the stringer becomes more cost efficient, because both can be cut to length as desired.

A vehicle hull window frame attachment system may have at least one of the above window frame attachment systems and a vehicle hull, wherein the window frame is enclosed by the space cutout from the stringer, wherein at least one of the two stringers comprises the space. Thereby attachment of the stringer coupling to the window frame can further include the attachment to a vehicle hull through the same first through-holes.

The through-holes may be rivet holes by means of which the first stringer coupling portion, the first window frame portion and the vehicle hull are riveted to each other, and/or the second stringer coupling portion, the stringer and the vehicle hull are riveted to each other, and/or the stringer coupling and the stringer are riveted to each other. Thereby the respective elements can be tightly held in one direction, while allowing the above mentioned decoupling arrangement in another direction orthogonal to the one direction. Of course, instead of a rivet, another fastening member, such as bolts or screws, may be provided.

The above systems may be used in a vehicle, preferably in an aircraft, more preferably in an airplane. Thereby the strict requirements for aircraft and airplanes can be fulfilled, while the above decoupling arrangement is integrated, which in this case not only improves the structural integrity of the window frame during use and forces acting on the stringer coupling or stringer, but also allows the provision of larger window frames and, thus, window frame apertures. Of course, the same applies to other types of vehicles and aircraft, such as ships and helicopters, respectively.

BRIEF DESCRIPTION OF THE DRAWINGS

The invention will be further described under reference to the enclosed schematic drawings, wherein similar elements have similar reference signs. In these drawings, FIG. 1 shows a conventional airplane window frame, in a perspective view;

FIG. 2 shows a fuselage of an airplane with parallel stringers and an elongated hole-shaped aperture for the window frame of FIG. 1, in a perspective view from the inside of the airplane;

FIG. 3 shows the window frame of FIG. 1 attached to the aperture of FIG. 2, in a perspective view from the inside of the airplane;

FIG. 4 shows an alternative airplane window frame with symmetrically arranged extensions, in a perspective view;

FIG. 5 shows a fuselage of an airplane with parallel stringers and the alternative window frame of FIG. 4 placed in an elongated aperture with its extensions in respective cutout spaces of the stringers, in a perspective view from the inside of the airplane;

FIG. 6 shows the fuselage of FIG. 5 with stringer couplings placed over the extensions and the stringers, in a perspective view from the inside of the airplane;

FIG. 7 shows cross-section A-A of FIG. 6 through the center of the alternative window frame and enlarged portions thereof.

DETAILED DESCRIPTION OF THE PREFERRED EMBODIMENTS

Figure 8:
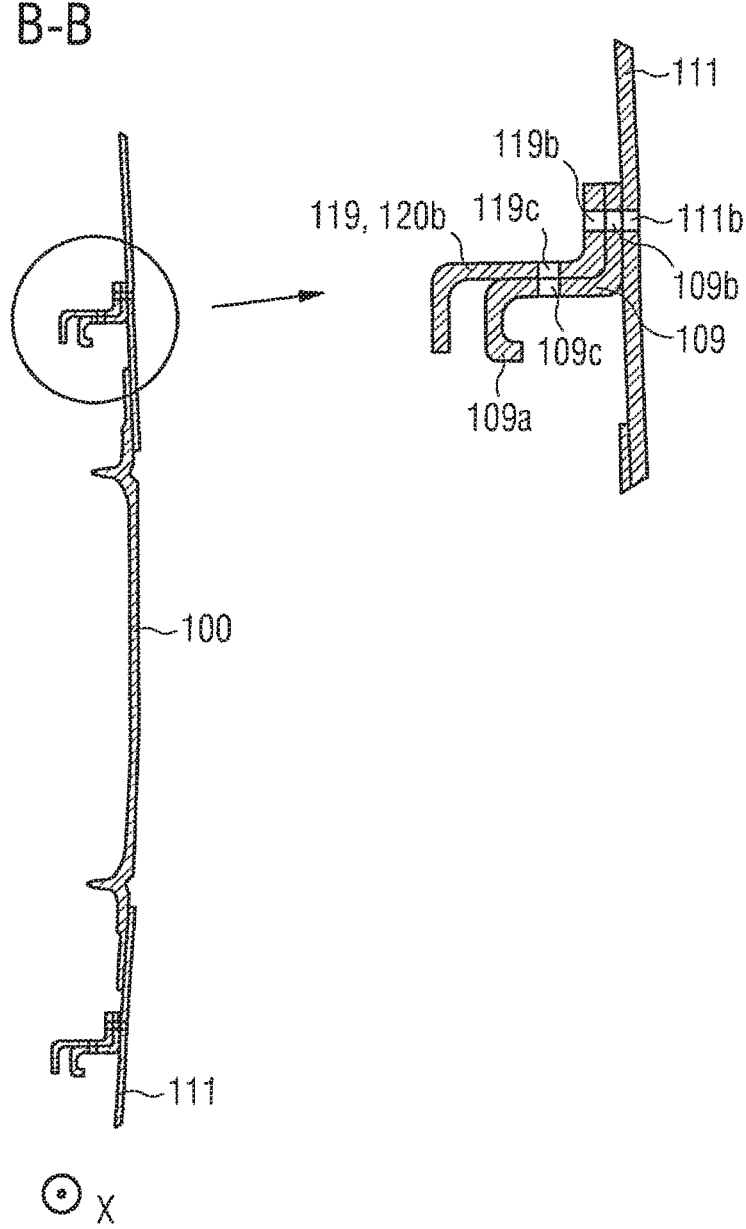
FIG. 8 shows cross-section B-B of FIG. 6 through an edge portion parallel to the center of the alternative window frame and an enlarged portion thereof.

FIG. 1 shows a symmetrical window frame 1 with an aperture 3 there-through shaped as an elongated hole. The window frame 1 comprises two portions 5, 7 surrounding the aperture 3. These portions 5, 7 have different heights/thicknesses, such that they form a step between them, wherein the outer first portion 7 has a smaller height/thickness compared to the inner second portion 5. Hence, a stepped down cross-section of the window frame 1 towards its outer edge is formed. Through-holes 5a, 5b and 7a, 7b are arranged equidistantly from the aperture 3 in the respective portions 5 and 7. A tangential portion of the first portion 7 having the through-holes 7a is referred to as the first window frame portion 15. The remainder of the window frame 1 together with through-holes 5a, 5b, 7b is referred to as the second window frame portion 17.

FIG. 2 shows a fuselage with parallel Z-shaped stringers 9 attached to a hull 11. In between the stringers 9 an elongated hull aperture 13 extends orthogonally towards the stringers 9. Naturally, the hull 11 has through-holes around the elongated hull aperture 13 which correspond to the through-holes 5a, 5b and 7a, 7b of the window frame 1.

FIG. 3 shows a state in which the window frame 1 of FIG. 1 is attached to the hull 11 of FIG. 2 via fastening members, such as rivets, extending through the through-holes of the hull 11 and the corresponding through-holes 5a, 5b and 7a, 7b of the window frame 1, such that the window frame 1 is indirectly connected to the stringers 9 only via the hull 11.

FIG. 4 shows an alternative window frame 100 with an aperture 103 and two portions 105, 107 having respective through-holes 105a, 105b and 107a, 107b, similar to the window frame 1 shown in FIG. 1. However, the alternative window frame 100 differs in that through-holes 107a are arranged along a tangential line in an extension 115 of the first portion 107. This extension 115 is also referred to as the first window frame portion 115, which is rectangular with rounded edges. The remainder of the window frame 1 together with through-holes 105a, 105b, 107b is referred to as the second window frame portion 117.

FIG. 5 shows a fuselage with parallel Z-shaped stringers 109 attached to a hull 111 with an elongated hull aperture 130 in between the stringers 109, similar to FIGS. 2 and 3. However, the stringers 109 differ in that they have a cutout 110, which is longer than a length of the first window frame portion 115 in a main extension direction X. Such an assembly allows the increase of the hull aperture 113 and, thus, the window frame aperture 103. Hence, only one cutout 110 in one of the stringers 109 already achieves this to a certain extent.

FIG. 6 shows the fuselage assembly of FIG. 5 with the additional provision of a stringer coupling 119. The stringer coupling 119 has a length corresponding to the width of the window frame 100, is Z-shaped and placed over the stringer 109 and the first window frame portions 115 in order to act as a bridge between the two parts of the stringers 109 separated by the cutout 110. The stringer coupling 119 is described in greater detail with reference to FIGS. 7 and 8.

FIG. 7 shows cross-section A-A through the fuselage of FIG. 6, in particular through a center plane extending in the longitudinal direction Y of the window frame 100. Enlarged views on the right of FIG. 7 show an overlapping arrangement of a first stringer coupling portion 120a, an adjustment shim 121, the first window frame portion 115 and the hull 111. These have coaxial through-holes 119a, 121a, 107a and 111a, respectively. While the through-holes 121a, 107a and 111a have equal diameters, e.g., 5.6 mm, the first stringer coupling portion through-holes 119a have a larger diameter, e.g., 5.8 mm, in particular a larger diameter than the first window frame through-holes 107a, in order to achieve the decoupling effect. The adjustment shim 121 is optional, as it increases the height/thickness of the first window frame portion 115 to the height/thickness of the stringer 109. The adjustment shim 121 could be omitted, if the height/thickness of the first window frame portion 115 is equal to the height/thickness of the stringer 109, for example.

FIG. 8 shows cross-section B-B through the fuselage of FIG. 6, in particular through a plane extending in the longitudinal direction Y of the window frame 100 and being parallel to the center plane of FIG. 7, such that an edge portion of the window frame 100 is crossed. In this, the attachment of the stringer coupling 119 to the stringer 109 is achieved by two sets of through-holes being orthogonal to each other. The first set comprises coaxial, equal diameter through-holes 119b, 109b and 111b through a second stringer coupling portion 120b, the stringer 109 and the hull 111, respectively. The second set comprises coaxial, equal diameter through holes 119c and 109c through the second stringer coupling portion 120b and the stringer 109, respectively. The second stringer coupling portion 120b extends on opposite sides from the first stringer coupling portion 120a in the extension direction X of the first stringer coupling portion 120b, such that, in an overlapping arrangement, it remains exposed from the window frame 100. In this case, the first stringer coupling through-holes 119a have a larger diameter than the second stringer coupling through-holes 119b.

Here, the stringer 109 and the stringer coupling 119 are similarly shaped, i.e., resemble each other's shape, with only the stringer 109 having an orthogonal reinforcement nose 109a and having a shortened middle section compared to the stringer coupling 119. Of course, both, the stringer 109 and the stringer coupling 119, may be equally shaped, i.e., have a corresponding shape, such that both look like the stringer coupling 119.

While the window frame 1 of FIG. 1 lacks an extension of the first portion 7, such as the alternative window frame 100 of FIG. 4, it can be still be used for the decoupling arrangement described with reference to FIGS. 4 to 8. In order to do so, only the stringer coupling 119 will be adapted appropriately. For example, the stringer coupling 119 may have a recess or an indentation adapted to receive the first window frame portion 15. Such a recess or indentation could advantageously have a depth equal to or greater than the thickness of the first window frame portion 15.

Of course, instead of providing separate stringer 109 and stringer couplings 119, the stringer coupling 119 may be adapted to serve as a stringer 109 with a recess or indentation therein, as described above. This modification can be applied to both, the conventional window frame 1 and the alternative window frame 100.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A window frame system, comprising
a window frame having an aperture there-through and circumferentially arranged window frame through-holes, wherein the window frame through-holes are arranged in a first window frame portion and a second window frame portion, and
a stringer coupling with stringer coupling through-holes, wherein the stringer coupling through-holes are arranged in a first stringer coupling portion and a second stringer coupling portion,
wherein, in an overlapping arrangement, the through-holes of the first window frame portion coaxially overlap with the through-holes of the first stringer coupling portion,
wherein the respective through-holes of the first window frame portion and the first stringer coupling portion have different diameters such that a shearing force in a plane of the window frame or the first window frame portion is not transmitted from the window frame to the stringer coupling by a fastener extending through the through-holes.

2. The window frame system according to claim 1, wherein the first stringer coupling through-holes have a larger diameter than the first window frame through-holes.

3. The window frame system according to claim 1, a plurality of first window frame portions symmetrically arranged on opposite outer sides of the second window frame portion.

4. The window frame system according to claim 1, wherein the aperture is a circular or an elongated hole.

5. The window frame system according to claim 1, wherein the window frame through-holes are arranged equidistantly from the aperture in at least one portion surrounding the aperture, and
wherein, in the overlapping arrangement, the first stringer coupling through-holes overlap with the first window frame through-holes in an outermost portion of the window frame.

6. The window frame system according to claim 1, wherein the second window frame portion surrounds the aperture uniformly, while the first window frame portion extends tangentially to the second window frame portion.

7. The window frame system according to claim 6, wherein the first window frame portion is rectangular.

8. The window frame system according to claim 7, wherein the first window frame portion has rounded edges.

9. The window frame system according to claim 1, wherein
the window frame through-holes are arranged in at least two portions surrounding the aperture, and at least two portions are at different heights in a stepped down cross-section at, and towards, an outer edge of the window frame.

10. The window frame system according to claim 1, wherein the stringer coupling is configured to extend in a longitudinal direction beyond the window frame in the overlapping arrangement.

11. The window frame system according to claim 1, wherein the first stringer coupling through-holes have a larger diameter than the second stringer coupling through-holes.

12. The window frame system according to claim 1, wherein
a length of the stringer coupling is longer than a width of the window frame, and
the stringer coupling is one of Z-, V-, W- or Π-shaped.

13. The window frame system according to claim 1, wherein the stringer coupling has a recess or an indentation adapted to receive the first window frame portion, the recess or the indentation having a depth equal to or greater than a thickness of the first window frame portion, and the first window frame portion having the same material thickness as the second stringer coupling portion.

14. A window frame attachment system with a window frame system according to claim 1, and at least one stringer, wherein
the first window frame portion is configured to fit in a space cut out from a stringer, in the overlapping arrangement,
the space being longer than a length of the first window frame portion in a main extension direction of the first window frame portion,
the space being as long as the sum of the length of the first window frame portion in its main extension direction and a diameter difference between the first through-holes of the first portions.

15. The window frame attachment system according to claim 14, wherein the stringer coupling corresponds to the shape of the stringer.

16. A vehicle hull window frame attachment system with a window frame attachment system according to claim 14, and a vehicle hull, wherein the window frame is enclosed by the space cut out from the stringer, and at least one of the two stringers has the cut out space.

17. The vehicle hull window frame attachment system according to claim 16, wherein the first stringer coupling portion, the first window frame portion and the vehicle hull are riveted to each other.

18. The vehicle hull window frame arrangement system according to claim 16, wherein the second stringer coupling portion, the stringer and the vehicle hull are riveted to each other.

19. The vehicle hull window frame arrangement system according to claim 16, wherein the stringer coupling and the stringer are riveted to each other.

20. An aircraft incorporating a vehicle frame system according to claim 1.

* * * * *